(12) United States Patent
Coran

(10) Patent No.: US 6,982,112 B2
(45) Date of Patent: Jan. 3, 2006

(54) METHOD OF COATING RUBBER WITH SOLVENTLESS CRYSTALLINE POLYOLEFIN COATINGS

(75) Inventor: Aubert Y. Coran, Akron, OH (US)

(73) Assignee: GenCorp, Inc., Sacramento, CA (US)

( * ) Notice: Subject to any disclaimer, the term of this patent is extended or adjusted under 35 U.S.C. 154(b) by 304 days.

(21) Appl. No.: 10/189,329

(22) Filed: Jul. 3, 2002

(65) Prior Publication Data

US 2003/0087060 A1 May 8, 2003

Related U.S. Application Data

(62) Division of application No. 09/567,911, filed on May 10, 2000, now Pat. No. 6,440,492.

(51) Int. Cl.
*B32B 3/04* (2006.01)

(52) U.S. Cl. .................. 428/122; 428/141; 428/144; 428/332; 428/147; 428/340; 428/341; 49/490.1

(58) Field of Classification Search ............... 428/122, 428/141, 144, 332, 147, 340, 341, 194; 49/490.1
See application file for complete search history.

(56) References Cited

U.S. PATENT DOCUMENTS

| | | | | |
|---|---|---|---|---|
| 2,711,985 A | * | 6/1955 | Olson | |
| 3,112,300 A | * | 11/1963 | Natta et al. | |
| 3,891,499 A | * | 6/1975 | Kato et al. | |
| 4,035,528 A | * | 7/1977 | Poppe et al. | |

(Continued)

FOREIGN PATENT DOCUMENTS

| | | | |
|---|---|---|---|
| EP | 0 472 268 A2 | | 2/1992 |
| JP | 581559818 | * | 9/1983 |
| JP | 01 123837 A | | 5/1989 |
| JP | 05 178098 A | | 7/1993 |

OTHER PUBLICATIONS

"General Properties of Ethylene and Propylene Polymers according to ASTM", Saechtling International Plastics Handbook for the Technologist, Engineer and User, Copyright 1987, reprinted 1992, p. 164.*
Textbook of Polymer Science, 3rd Edition, Fred W. Billmeyer, Jr., pp. 367–368, 1984.*

*Primary Examiner*—Deborah Jones
*Assistant Examiner*—Jane Rhee
(74) *Attorney, Agent, or Firm*—Calfee, Halter & Griswold, LLP

(57) ABSTRACT

A novel laminate useful for seals particularly for vehicle window seals that are flexible, wear resistant and have a low coefficient of friction, is provided. The laminate comprises a rubber substrate and a polyolefin coating disposed on and adherent to the rubber substrate. The invention also provides novel methods of making laminates, particularly seals. Such method comprises the following steps: providing a rubber substrate; then applying a powdered crystalline polyolefin to the rubber substrate, in an amount sufficient to form a continuous layer when melted; and then melting the powdered crystalline polyolefin to form a continuous polyolefin coating disposed on, and adherent to, the rubber substrate. The invention also relates to seals comprising: an polyolefin rubber body; and a continuous coating of fused polyolefin disposed on and adherent to the rubber seal. Preferably the continuous coating of fused polyolefin is disposed in the glass run channel in the rubber body.

16 Claims, 2 Drawing Sheets

U.S. PATENT DOCUMENTS

| | | | | |
|---|---|---|---|---|
| 4,130,534 A | * | 12/1978 | Coran et al. |
| 4,224,379 A | * | 9/1980 | Ichinose et al. |
| 4,311,628 A | * | 1/1982 | Abdou-Sabet et al. |
| 4,515,646 A | * | 5/1985 | Walker et al. |
| 4,594,285 A | * | 6/1986 | Osawa et al. |
| 4,594,390 A | * | 6/1986 | Abdou-Sabet et al. |
| 4,648,207 A | * | 3/1987 | Shibasaki |
| 5,013,379 A | * | 5/1991 | Brooks et al. |
| 5,183,613 A | * | 2/1993 | Edwards |
| 5,290,880 A | * | 3/1994 | Moench et al. |
| 5,306,537 A | * | 4/1994 | Gustafson et al. |
| 5,397,832 A | * | 3/1995 | Ellul |
| 5,503,700 A | * | 4/1996 | Dupuy |
| 5,827,608 A | * | 10/1998 | Rinehart et al. |
| 6,146,739 A | * | 11/2000 | Itoh et al. |

* cited by examiner

METHOD OF COATING RUBBER WITH SOLVENTLESS CRYSTALLINE POLYOLEFIN COATINGS

RELATED APPLICATION

This application is a divisional of application Ser. No. 09/567,911, filed May 10, 2000, now U.S. Pat. No. 6,440,492 which is fully incorporated by reference herein.

BACKGROUND OF THE INVENTION

Many vehicle seals are flexible to conform to vehicle glass to seal out the elements. The flexibility must be maintained over a wide range of temperatures. Moreover, the seal area in contact with glass requires a low coefficient of friction so that when glass is raised or lowered, the seal does not stick to the glass. While ethylene-propylene-diene monomer rubber (EPDM) has a suitable flexibility, it has a less than preferred coefficient of friction. In an attempt to reduce the coefficient of friction, the surface of ethylene-propylene-diene monomer rubber has been coated with polyurethane. However, the polyurethane coating is not particularly resistant to wear, which results in failure of the seal within a relatively short time. Attempts have been made to produce seals with polymeric coatings other than polyurethane; however such seals typically employ volatile organic solvents during the manufacturing process. Such volatile organic solvents have recently become the subject of governmental regulation.

It would be desirable to have a flexible, wear resistant seal, having a low coefficient of friction, and which is applied without volatile organic solvents.

SUMMARY OF THE INVENTION

The present invention provides novel laminate useful for seals, particularly for vehicle window seals that are both flexible and wear resistant and have a low coefficient of friction, preferably with an initial coefficient of friction below 0.5. The laminate comprises a rubber substrate and a polyolefin coating disposed on and adherent to the rubber substrate.

The invention also provides novel methods of making seals; such a method comprises the following steps: providing a rubber substrate; then applying a powdered crystalline polyolefin to the rubber substrate, in an amount sufficient to form a continuous layer when melted; and then melting the powdered crystalline polyolefin to form a continuous polyolefin coating disposed on and adherent to the rubber substrate. The invention also relates to seals comprising: a polyolefin rubber substrate; and a continuous coating of fused polyolefin disposed on and adherent to the rubber substrate.

DETAILED DESCRIPTION OF THE INVENTION

Figure 1:
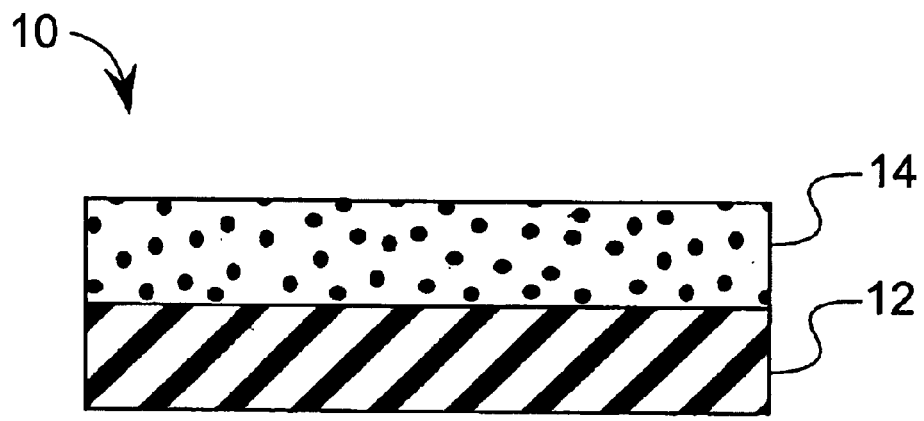
FIG. 1 shows the laminate, composed of the rubber substrate and the polyolefin coating disposed on the rubber substrate.
Figure 2:
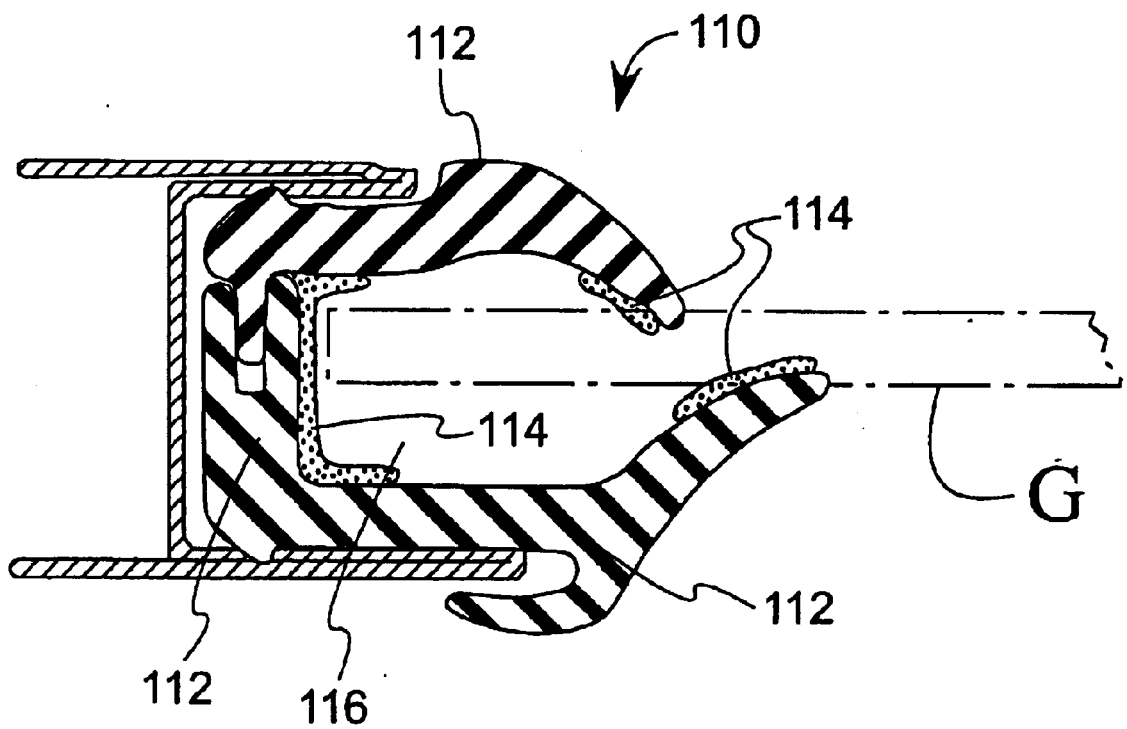
FIG. 2 shows an embodiment of a vehicle seal composed of the rubber substrate and the polyolefin coating disposed in the glass run channel.
Figure 3:
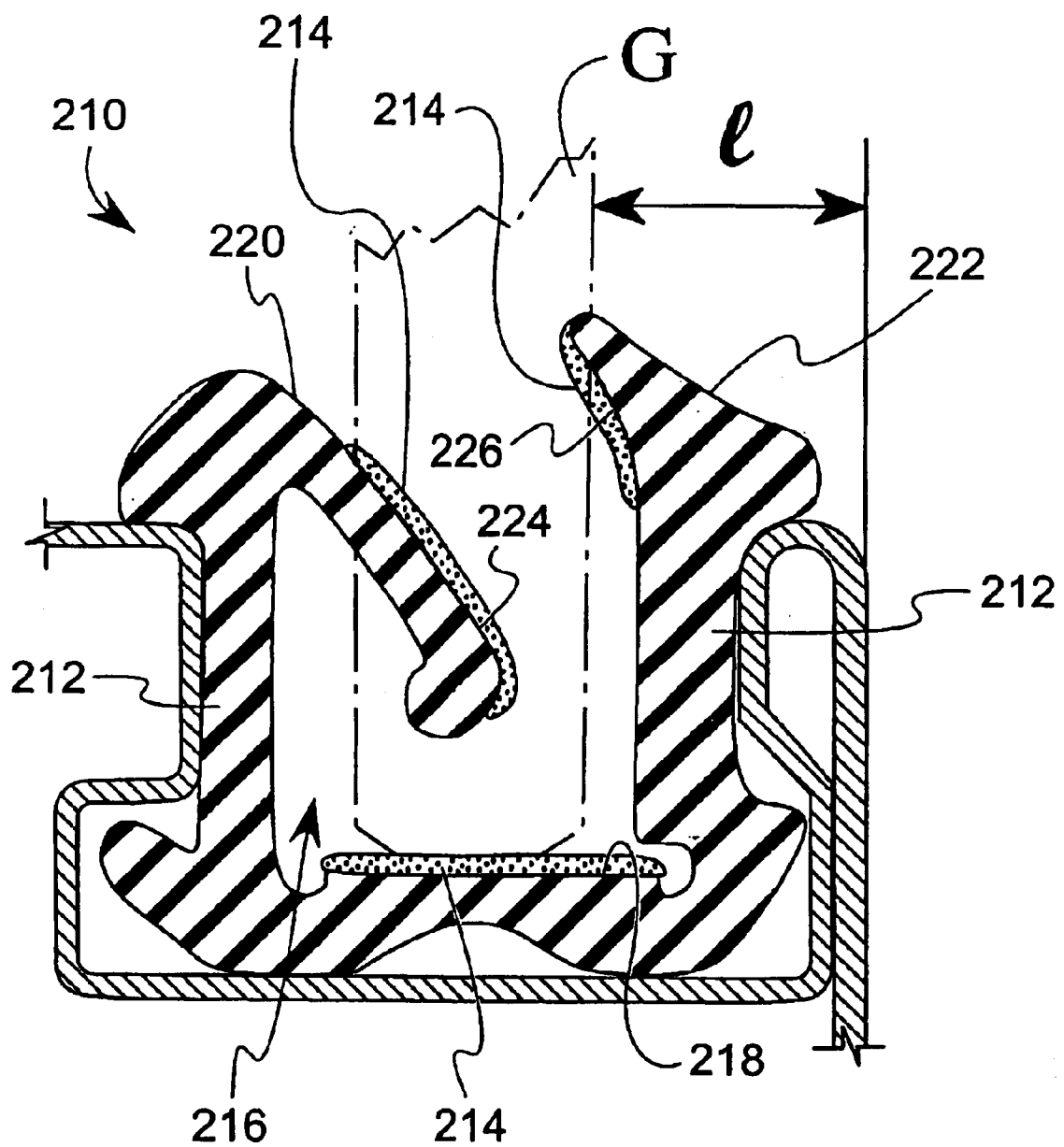
FIG. 3 shows a another embodiment of a vehicle seal composed of the rubber substrate and the polyolefin coating disposed in the glass run channel.

Referring to FIG. 1 the coated substrate 10 is shown, which is composed to the rubber substrate 12 and the polyolefin coating 14. Referring to FIG. 2, a vehicle seal 110 is shown composed of rubber substrate, more specifically rubber body 112 and polyolefin coating 114 disposed in the glass run channel 116. Referring to FIG. 3, a vehicle seal 210 is shown composed of rubber substrate, more specifically rubber body 212 having glass run channel 216. The polyolefin coating 214 is disposed on the channel face surface 218 of rubber body 212 and optionally on the glass-contacting surfaces 224 and 226 of lip 220 and lip 222 of the rubber body 212. Glass G is shown in glass run channel 216.

The coated rubber has an abrasion resistance preferably greater than 30 cycles/$\mu$m, more preferably greater than 100 cycles/$\mu$m, even more preferably greater than 200 cycles/$\mu$m, most preferably greater than 300 cycles/$\mu$m. The coating adheres well to the rubber. The coated rubber has a coefficient of friction preferably below 0.5, preferably less than 0.4, more preferably less than 0.3. Preferably the coefficient of friction is from 0.01 to 0.5, more preferably from 0.01 to 0.4, most preferably from 0.1 to 0.3.

The polyolefin coating preferably is preferably from 5 $\mu$m to 3 mm, more preferably from 25 $\mu$m to 0.9 mm, in average thickness.

Forming the Polyolefin Coating on the Rubber Substrate

The method involves coating a rubber with a crystalline polyolefin powder. The crystalline polyolefin powder is typically applied by conventional application techniques, such as, for example, by sprinkling, by dipping, by powder-dropping from a continuous feeder belt; by electrostatic spray; by running extrudate through a powder fluid bed; by drawing down by applicator, or by a powder-coating gun. Alternatively, a rubber substrate emerging from an extruder is passed through a crystalline polyolefin powder—inert gas bed. The crystalline polyolefin powder is applied to a rubber substrate, which substrate is preferably at a temperature of from −40° C. to 315° C. and may be applied to cured or uncured rubber substrate.

The layer of the crystalline polyolefin powder has an average thickness greater than 5 $\mu$m. Once the crystalline polyolefin powder is applied to the substrate, it is heated to melt and fuse the powder. Where the crystalline polyolefin polymer has a molecular weight of greater than about 3,000,000, the crystalline polyolefin powder typically incompletely fuses upon heating, and the crystalline polyolefin powder while still molten is preferably compressed by rolling such as with a glass or metal cylinder. However, during the rolling process care is to be taken to not shift the mass of heated polyolefin coating; such shift decreases the adhesion of the polyolefin coating when the coated substrate is cooled.

Where the rubber substrate is not fresh, for example the rubber substrate displays bloom, it is preferable that the surface of the rubber substrate is cleaned before applying the crystalline polyolefin powder. The bloom is typically the result of components such as sulfur, stearic acid or antioxidants and the like, migrating to the surface of the rubber substrate. Conventional cleaning techniques are suitable. Good results have been obtained by abrading pre-vulcanized rubber, such as with emery paper or by solvent cleaning such as by wiping with toluene or mineral spirits or by both abrading and solvent cleaning. Where the surface is abraded, it is preferred that fine particulates produced by the abrading process be removed such as by rinsing. Good results have been obtained by using toluene. Air jets or water jets are also suitable for such rinsing.

Where vehicle sealing strips are prepared by extrusion, the polyethylene powder is preferably applied to the moving rubber extrudate after it exits the extruder die, but before the rubber extrudate enters a curing oven. As the rubber extrudate is heated for curing, the powder fuses and adheres to the substrate rubber. An advantage of applying the powder polyolefin to fresh rubber from the extruder is that the rubber does not require cleaning prior to the application of the powder.

Optionally, various textures, and colors are created in the polyolefin coating. Optionally, conventional pigments are added to the polyolefin coating prior to heating the coated substrate. Conventional pigments such as for example titanium dioxide, carbon black, and conventional colored pigments are suitable. Optionally, texture is imparted to the polyolefin coating by varying the powder particles size and molecular weight of the polyolefin polymer. Larger particle sizes and higher molecular weights tend to produce rougher surfaces. Optionally, texture is imparted to the surface of the coating by using a blend of differing molecular weight polyolefin polymers or different types of polyolefin polymers, such as for example a blend of LDPE and UHMWPE or LDPE and isotactic polypropylene. Optionally, texture is imparted to the surface of the coating by varying the amount of crystalline polyolefin powder initially applied to the rubber; areas with greater quantities will provide bumps whereas areas having less crystalline polyolefin powder will produce valleys. Alternatively, smooth rollers or textured rollers are impressed into the warm polyolefin coating to provide the polyolefin coating with a smooth surface or a textured surface.

The Rubber Substrate

The rubber substrate is flexible and comprises an aliphatic hydrocarbon polyolefin rubber. Preferably the polyolefin/aliphatic hydrocarbon rubber is unsaturated, preferably having a diene content of less than about 15 weight percent, preferably less than about 10 weight percent. Preferably, the rubber is a conventional rubber such as used in vehicle seals. Suitable rubbers are, for example, natural rubber, blends comprising a thermoplastic, crystalline polyolefin polymer and vulcanized hydrocarbon rubber particles as described in U.S. Pat. No. 4,130,534 to Coran, et al. issued Dec. 19, 1978; U.S. Pat. No. 4,130,535 to Coran, et al. issued Dec. 19, 1978; U.S. Pat. No. 4,311,628 to Abdou-Sabet, et al. issued Jan. 19, 1982; U.S. Pat. No. 4,594,390 to Abdou-Sabet, et al. issued Jun. 10, 1986; U.S. Pat. No. 5,397,832 to Ellul issued Mar. 14, 1995; and U.S. Pat. No. 5,290,880 to Moench, et al. issued May 1, 1994, synthetic polyisoprene rubber, polybutadiene rubber, ethylene propylene diene terpolymer (hereinafter "EPDM"), ethylene propylene rubber (hereinafter "EPR"), butyl rubber, (hereinafter "IIR"), chlorobutyl rubber, (hereinafter "CIIR") and bromobutyl rubber, (hereinafter "BIIR") The rubber polymer in the rubber substrate preferably has a weight average molecular weight of 50,000 to 2,000,000, g/mole, more preferably from 80,000 to 500,000 g/mole, most preferably from 100,000 to 300,000 g/mole.

The Crystalline Polyolefin Powder

The crystalline polyolefin powder comprises crystalline polyolefin polymer. The crystalline polyolefin polymer has a crystallinity $X_c$ of preferably from 20 wt. % to 100 wt. %, more preferably from 30 wt. % to 100 wt. %, even more preferably from 40 wt. % to 100 wt. %, most preferably from 40 wt. % to 88 wt. %, as estimated from the density of the crystalline polyolefin polymer. Thus:

$$X_c = 100 \times \frac{(Ps - Pa)}{(Pc - Pa)}$$

where Ps is the density of the sample, Pa is the pure crystal density (1.000) and Pc is the pure amorphous density (0.85).

The crystalline polyolefin powder preferably has an average particle diameter of 600 μm or greater, and preferably 5 μm or greater. Preferably, the crystalline polyolefin powder particle size is from 5 μm to 600 μm, more preferably from 10 μm to 350 μm; most preferably from 90 μm to 250 μm.

The crystalline polyolefin powder preferably has a maximum particle size of 1 mm or less, and preferably 600 μm or less. Preferably the maximum crystalline polyolefin in powder particle size is from 10 to 1 mm, more preferably from 15 μm to 600 μm, even more preferably from 20 μm to 500 μm; most preferably from 25 μm to 300 μm.

The crystalline polyolefin powder preferably has a melt flow index at 190° C. under a load of 2 kg, from 0.0 to 100 g/10 minutes, more preferably from 0.0 to 50 g/10 minutes, and even more preferably from 0.0 to 25 g/10 minutes. The crystalline polyolefin powder preferably has a melt flow index at 190° C. under a load of 5 kg, from 0.0 to 200 g/10 minutes, more preferably from 0.0 to 100 g/10 minutes, and even more preferably from 0.5 to 50 g/10 minutes. The crystalline polyolefin powder preferably has a melt flow index at 190° C. under a load of 21.6 kg, from 0.0 to 500 g/10 minutes, more preferably from 5.0 to 250 g/10 minutes, and even more preferably from 10 to 100 g/10 minutes.

The crystalline polyolefin polymer preferably has a melting point greater than 100° C. but less than the decomposition point of the rubber substrate.

The polyolefin polymer is preferably a homopolymer or copolymer of polypropylene or of polyethylene or mixtures thereof.

Where the crystalline polyolefin powder comprises polyethylene, the crystalline polyolefin powder comprises at least one high density polyolefin polymer, having a weight average molecular weight of 30,000 to 10,000,000 g/mole, more preferably from 30,000 to 1,000,000 g/mole, even more preferably 100,000 to 600,000 g/mole, most preferably from 200,000 to 400,000 g/mole.

As used herein, the term "high density polyethylene" means conventional high density polyethylene polymers as well as conventional ultra-high molecular weight linear polyethylene polymers, and thus "high density polyethylene" as used herein includes linear polymers having a density of 0.94 to 0.97, as well as linear polymers having a molecular weight of 3,000,000 or higher, and having a density of 0.93 or higher.

As used herein, the term "low density polyethylene" means conventional low density polyethylene polymers, as well as conventional medium density branched polyethylene polymers, and thus "low density polyethylene" as used herein includes branched polyethylene polymers having a density of 0.915 to 0.93, as well as branched polyethylene polymers, having a density of 0.89 to 0.94.

High density polyethylene polymers having molecular weights above 3,000,000 tend to produce coatings which are incompletely fused and do not adhere well to the substrate. Preferably a second polyethylene polymer is therefore added to such ultra high molecular weight polyethylene polymer. Such second polyethylene polymer is either a low density polyethylene polymer having a weight average molecular weight of preferably from 30,000 to 150,000 g/mole or a high density polyethylene polymer having a weight average molecular weight of preferably from 10,000 to 2,000,000 g/mole, more preferably from 30,000 to 150,000 g/mole.

Where the polyolefin comprises polypropylene, the polypropylene is preferably isotactic and preferably has a density from 0.880 to 0.92 and a crystallinity preferably between 30% and 100% by weight.

In one preferred embodiment, the crystalline polyolefin powder comprises a blend of crystalline polyolefin powders;

specifically the crystalline polyolefin powder comprises from 10 to 90 parts by weight of a powdered high-density polyethylene polymer having a weight-average molecular weight between 200,000 and 10,000,000 g/mol., and 90–10 parts by weight of a powdered high- or low-density polyethylene polymer, having a weight-average molecular weight between 30,000 and 150,000 g/mole.

In another preferred embodiment, the crystalline polyolefin powder comprises a blend of crystalline polyolefin powders; specifically the crystalline polyolefin powder comprises 25 to 75 parts by weight of a powdered high-density polyethylene polymer, having a weight-average molecular weight between 250,000 and 6,000,000 g/mol., and 75 to 25 parts by weight of powdered high density polyethylene polymer, having a weight average molecular weight between 40,000 and 150,000 g/mole.

Generally, where the crystalline polyolefin powder comprises only one crystalline polyolefin polymer, it is preferred that such polyolefin polymer is a high density polyethylene having a weight average molecular weight of from 30,000 to 3,000,000 g/mole, more preferably from 100,000 to 1,000,000 g/mole, even more preferably from 200,000 to 600,000 g/mole, most preferably from 200,000 to 400,000 g/mole.

Polyolefin polymers having a molecular weight below 30,000 g/mole tend to produce coatings displaying high wear rate, and are not preferred.

Examples of crystalline polyolefin polymers suitable alone or in a blend to form the polyolefin coating are listed in Tables IA, IB and 1C below.

TABLE IA

CRYSTALLINE POLYOLEFIN POWDERS

| Property | Hostalen GHR 8110 UHMWHDPE Ticona | Hostalen GHR 8020 UHMW HDPE Ticona | Hostalen GUR400F UHMW HDPE Ticona | Coathylene HA 1931 LDPE Composite Particles | Hostalen GUR X117 UHMW HDPE Ticona | HDPE Spectroscopy Grade MP*: 130–145° C. Aldrich |
|---|---|---|---|---|---|---|
| MFI A | — | — | — | 2 | — | — |
| MFI B | — | 0.5 | — | — | — | — |
| MFI C | 0.8–1.6 | 14 | <1 | | <1 | — |
| Density (g/cm³) | 0.95 | 0.95 | 0.93 | 0.919 | 0.93 | — |
| Crystalline melting range (° C.) | — | 130–135 | 130–135 | 108–113 | 130–135 | 130–140 |
| Vicat softening point (° C.) | — | — | — | 87 | — | — |
| Number avg. mw (g/mole) | — | — | — | 32,000 | — | — |
| Weight avg. mw (g/mole) | 600,000 | 300,000 | more than 6,000,000 | 730,000 | 4,400,000 | — |
| Max. particle size (d) micrometers | <500 | — | 125 | 75 | 125 | — |
| Mid-range particle size | 120 | 210 | c. 60 | 17 | c. 60 | — |
| Mesh size | — | — | — | 200 | — | — |

TABLE IB

CRYSTALLINE POLYOLEFIN POWDERS

| Property | UHMW PE Aldrich | UHMW PE Treated Surface Aldrich | Coathylene NB6454 HDPE Clariant | Coathylene NC5374F HDPE Clariant | Coathylene HA2454 LDPE* Clariant | Coathylene HO1681 LDPE Clariant |
|---|---|---|---|---|---|---|
| MFI A | — | — | 8 | 20 | 7 | 70 |
| MFI B | — | — | — | — | — | — |
| MFI C | — | — | — | — | — | — |
| Density (g/cm³) | 0.94 | 0.94 | 0.964 | 0.953 | 0.9244 | 0.916 |

TABLE IB-continued

CRYSTALLINE POLYOLEFIN POWDERS

| Property | UHMW PE Aldrich | UHMW PE Treated Surface Aldrich | Coathylene NB6454 HDPE Clariant | Coathylene NC5374F HDPE Clariant | Coathylene HA2454 LDPE* Clariant | Coathylene HO1681 LDPE Clariant |
|---|---|---|---|---|---|---|
| Crystalline melting range (° C.) | 138 | 138 | 128–134 | 126–133 | 108–113 | 102–109 |
| Vicat softening point (° C.) | — | — | 127 | 124 | 91 | 70 |
| Number avg. mw (g/mole) | — | — | 25,000 | 18,000 | 30,000 | 21,000 |
| Weight avg. mw (g/mole) | 3,000,000 – 6,000,000 | — | 80,000 | 60,000 | 67,000 | 295,000 |
| Max. particle size (d) micrometers | — | — | 90 | 125 | 75 | 630 |
| Mid-range particle size | — | 180 | 30 | 75 | 17 | 305 |
| Mesh size | — | — | 170 | 120 | 200 | 38 |

TABLE IC

CRYSTALLINE POLYOLEFIN POWDERS

| Property | MDPE* MP*: 109–111 Aldrich | MICRO-SCRUB 50 HMW* LDPE Micro Powders | Coathylene PY0787F homo-PP* Clariant | Coathylene PB0580 homo-PP Clariant | Propyl-matte 31 powder PP Micro Powders |
|---|---|---|---|---|---|
| MFI A. | — | — | — | — | — |
| MFI B | — | — | 60 | 100 | — |
| MFI C. | — | — | — | — | — |
| Density (g/cm$^3$) | 0.94 | — | 0.907 | 0.905 | 0.86 |
| Crystalline melting range (° C.) | 109–111 | 107–109 | 162–168 | 162–168 | 160–170 |
| Vicat softening point (° C.) | — | — | 148 | 145 | — |
| Number avg. mw (g/mole) | — | — | — | — | — |
| Weight avg. mw (g/mole) | — | — | — | — | — |
| Max. particle size (d) micrometers | — | 297 | 200 | 90 | 31 |
| Mid-range particle size micro-meters | — | — | 110 | 38 | 12 |
| Mesh size | — | 50 | 70 | 170 | — |

*MP—melting point melting range
MFI A—melt flow index (MI 190° C./2 kg) g/10 minutes
MFI B—melt flow index (MI 190° C./5 kg) g/10 minutes
MFI C—melt flow index (MI 190° C./21.6 kg) g/10 minutes
Manufacturer's designations:
HMW = high molecular weight,
UHMW = ultra-high molecular weight,
HDPE = high-density polyethylene,
MDPE = medium-density polyethylene

TABLE IC-continued

CRYSTALLINE POLYOLEFIN POWDERS

| Property | MDPE*<br>MP*: 109–<br>111<br>Aldrich | MICRO-<br>SCRUB 50<br>HMW*<br>LDPE<br>Micro<br>Powders | Coathylene<br>PY0787F<br>homo-PP*<br>Clariant | Coathylene<br>PB0580<br>homo-PP<br>Clariant | Propyl-matte<br>31 powder<br>PP<br>Micro<br>Powders |
|---|---|---|---|---|---|

PE = polyethylene,
LDPE = low-density polyethylene
PP = isotactic polypropylene

The polyethylene polymer available as Vistomer HD 2800 from Composite Particles Inc. is coated with a proprietary adhesive by the manufacturer and has a melt flow index at 190° C. under a load of 21.6 kg, of less than 1 g/10 minutes, a density of 0.93 g/cm$^3$, a crystalline melting range of 130–135, a weight average molecular weight of more than 6,000,000 a maximum particle size of 125 microns, a mid range particle size of c.60 and a mesh size of 8,000. The Vistomer HD 2800 polyethylene is less preferred particularly for use in a vehicle seal.

The following examples illustrate the invention and are not intended to be limiting.

The crystalline polyolefin powder was typically applied by one of two methods; by dipping or by drawing the crystalline polyolefin powder along the substrate with a tool. The dipping method involved placing the rubber substrate into the crystalline polyolefin powder to obtain about 0.2 to 2 mm layer of the powder on the substrate. The crystalline polyolefin powder was applied by dipping in Examples 3, 4, 6, 7, 18, 20–25, 33, 40 and 41.

Alternatively, about 1 gram of crystalline polyolefin powder was placed near one end of a 20 cm×2 cm rubber strip. A notched tool was used to draw down a strip of powder down the length of the strip. The tool, made from a sheet of a high-hardness rubber had a notch 1 cm wide and 2 mm deep. The tool applied a strip of crystalline polyolefin powder 2 cm wide and 1 to 2 mm thick and about 1 gram in weight, to the rubber substrate.

EXAMPLE 1

A coated substrate was prepared as follows. The surface of a piece of vulcanized, carbon black filled EPDM rubber was cleaning/roughening by abrading the surface by stroking the surface sheet about 20 times with emery paper. Then the surface was scrubbed with toluene for a short time and wiped dry. After a few minutes when the surface appeared to be dry by visual examination, the powder was applied.

The substrate was heated for 5 minutes at 230° C. in an air circulating oven. Then a layer of polyethylene powder sold under the trade name Hostalen GHR 8020 from Ticona, was applied by dipping the rubber substrate into the powder to form a layer of powder approximately 1 mm thick at the thickest points. The substrate was then placed in a 230° C. oven for 5 minutes and removed and cooled.

EXAMPLE 2

A coated substrate was prepared as in Example 1, except that after the coated substrate was removed from the oven, a room temperature glass cylinder or a steel cylinder was pressed and rolled over the molten polyolefin, by hand, for about 15 seconds. The cylinder was then removed; the resulting coated rubber was smooth and even.

EXAMPLE 3

A coated substrate was prepared as in Example 2, except that about one half the amount of crystalline polyolefin powder was used.

EXAMPLE 4

A coated substrate was prepared as in Example 3.

EXAMPLE 5

A coated substrate was prepared as in Example 2.

EXAMPLE 6

A coated substrate was prepared as in Example 1, except that the Polymatte 31 polypropylene was used instead of the GHR8020.

EXAMPLE 7

A coated substrate was prepared as in Example 6.

EXAMPLE 8

A coated substrate was prepared as in Example 2, except that the GURX117 polyethylene was used.

EXAMPLE 9

A coated substrate was prepared as in Example 1, except that Microscrub 50 polyethylene was used.

EXAMPLE 10

A coated substrate was prepared as in Example 1.

EXAMPLE 11

A coated substrate was prepared as in Example 2, except that Microscrub 50 polyethylene was used.

EXAMPLE 12

A coated substrate was prepared as in Example 2, except that a mixture of 60% by weight of the Microscrub 50 polyethylene and 40% by weight GHR 8020 polyethylene was used.

EXAMPLE 13

A coated substrate was prepared as in Example 1, except that GHR 8020 polyethylene was applied to an uncured substrate and thus not pre-cleaned.

EXAMPLE 14

A coated substrate was prepared as in Example 2, except that the GUR 400F polyethylene applied to an uncured substrate and thus not pre-cleaned.

EXAMPLE 15

A coated substrate was prepared as in Example 2, except that GURX117 polyethylene was used.

EXAMPLE 16

A coated substrate was prepared as in Example 2.

EXAMPLE 17

A coated substrate was prepared as in Example 2, except that GHR 8110 polyethylene was used.

EXAMPLE 18

A coated substrate was prepared as in Example 2, except that a mixture of 60% by weight of the 8020 polyethylene and 40% by weight MS50 polyethylene was used.

EXAMPLE 19

A coated substrate was prepared as in Example 2, except that a mixture of 50% by weight of the 8020 polyethylene and 50% by weight MS50 polyethylene was used.

EXAMPLE 20

A coated substrate was prepared as in Example 1, except that a mixture of 50% by weight of the 8020 polyethylene and 50% by weight MS50 polyethylene was used.

EXAMPLE 21

A coated substrate was prepared as in Example 1, except that a mixture of 25% by weight of the 8020 polyethylene and 75% by weight MS50 polyethylene was used.

EXAMPLE 22

A coated substrate was prepared as in Example 22.

EXAMPLE 23

A coated substrate was prepared as in Example 1, except that a thin layer of an ultra high molecular weight polyethylene from Aldrich was used.

EXAMPLE 24

A coated substrate was prepared as in Example 1, except that "high density polyethylene" spectroscopy grade 130–145° C. from Aldrich was used.

EXAMPLE 25

A coated substrate was prepared as in Example 1, except that a "medium density polyethylene" melting point 109–111° C. from Aldrich was used.

EXAMPLE 26

A coated substrate was prepared as in Example 2, except that ultra high molecular weight polyethylene from Aldrich was used.

EXAMPLE 27

A coated substrate was prepared as in Example 2, except that ultra high molecular weight polyethylene, having a treated surface, from Aldrich was used.

EXAMPLE 28

A coated substrate was prepared as in Example 2, except Vistamer HD 2800 polyethylene coated with a manufacturer's proprietary adhesive, was used.

EXAMPLE 29

A coated substrate was prepared as in Example 1, except Vistamer HD 2800 polyethylene, coated with a manufacturer's proprietary adhesive, was used.

EXAMPLE 30

A coated substrate was prepared as in Example 2, except that a the NC5374 Coathylene polyethylene was used.

EXAMPLE 31

A coated substrate was prepared as in Example 2, except that a the Coathylene NB6454 polyethylene was used.

EXAMPLE 32

A coated substrate was prepared as in Example 2, except Coathylene H01681 polyethylene with MFI of 70 was used.

EXAMPLE 33

A coated substrate was prepared as in Example 2, except that Coathylene HA2454 polyethylene was used.

EXAMPLE 34

A coated substrate was prepared as in Example 2, except that Coathylene HA1931 polyethylene from Clariant was used.

EXAMPLE 35

A coated substrate was prepared as in Example 2, except that Coathylene PB0580 polypropylene from Clariant was used.

EXAMPLE 36

A coated substrate was prepared as in Example 2, except that Coathylene PB0580 polypropylene from Clariant was used.

EXAMPLE 37

A coated substrate was prepared as in Example 2, except that Coathylene PYO787 polypropylene from Clariant was used.

EXAMPLE 38

A coated substrate was prepared as in Example 2, except that a mixture of 100 parts by weight of the 8020 polyethylene and 6.5 parts by weight molybdenum disulfide powder was used.

EXAMPLE 39

A coated substrate was prepared as in Example 1, except that a mixture of 100 parts of the MS50 polyethylene and 6.5 parts by weight molybdenum disulfide powder was used.

EXAMPLE 40

A coated substrate was prepared as in Example 2, except that a mixture of 50% by weight of the MS50 polyethylene and 50% by weight GHR 8020 polyethylene along with 6 parts molybdenum disulfide powder was used.

EXAMPLE 41

A coated substrate was prepared as in Example 2, except that a mixture of 25% by weight of the N6454 polyethylene and 75% by weight of the 8110 polyethylene was used.

EXAMPLE 42

A coated substrate was prepared as in Example 2, except that a mixture of 25% by weight of the N5374 polyethylene and 75% by weight GHR 8110 polyethylene was used.

EXAMPLE 43

A coated substrate was prepared as in Example 2, except that a mixture of 50% by weight of the N5374 polyethylene and 50% by weight GHR 8110 polyethylene was used.

EXAMPLE 44

A coated substrate was prepared as in Example 1, except that a mixture of 50% by weight of the N6454 polyethylene and 50% by weight of the 8110 polyethylene was used.

EXAMPLE 45

A coated substrate was prepared as in Example 1, except that a mixture of 75% by weight of the N5374 polyethylene and 25% by weight GHR 8020 polyethylene was used.

EXAMPLE 46

A coated substrate was prepared as in Example 1, except that the GHR 8110 polyethylene was used.

EXAMPLE 47

A coated substrate was prepared as in Example 1, except that a mixture of 25% by weight of the N5374 polyethylene and 75% by weight GHR 8110 polyethylene was used.

EXAMPLE 48

A coated substrate was prepared as in Example 1, except that a mixture of 38% by weight of the N5374 polyethylene and 62% by weight GHR 8110 polyethylene was used.

EXAMPLE 49

A coated substrate was prepared as in Example 1, except that N5374 polyethylene was used.

EXAMPLE 50

A coated substrate was prepared as in Example 1, except that a mixture of 75% by weight of the N5374 polyethylene and 25% by weight GHR 8100 polyethylene was used.

EXAMPLE 51

A coated substrate was prepared as in Example 1, except that a mixture of 50% by, weight of the N5374 polyethylene and 50% by weight GHR 8100 polyethylene was used.

COMPARATIVE EXAMPLE A

An EPDM rubber strip without a coating was used as a control.

COMPARATIVE EXAMPLE B

An EPDM rubber strip with a Versicoat® polyurethane as coating was prepared using conventional methods.

COMPARATIVE EXAMPLE C

A coated substrate was prepared as in Example 1, except that a thin layer less than 300 µm of GHR 8020 polyethylene was used.

Evaluation

The coated rubbers of the Examples and the Comparative Example were evaluated for abrasion resistance, coefficient of friction and adhesion. After cooling, the test strips were tested by using the crockmeter. The coefficient of friction was recorded as a function of the number of crockmeter cycles. The typical average thickness of the films prepared was about 20 mils (about 0.5 mm).

The durability of the samples was determined by test method entitled General Motors Engineering Standards, Seals Abrasion Resistance GM9909P:R1:ETSSLN, January 1993. The abrasion resistance was measured by using the wear resistance testing apparatus, as shown in FIG. 1 of the General Motors Standards. A 4 mm thick piece of non-tempered glass having a radius on the edge of 2.5 to 6 mm, with satin finish edge was rubbed, under weight, back and forth across the coated substrate. The samples of the coated substrates of the examples, were cut to 200 mm in length and trimmed as needed. The samples were mounted to a mounting fixture which was then attached to the wear resistance testing apparatus. The mounting fixture was centered and tighten so that the mounting fixture remained stationary and straight during the test. A weight of 2.7 kilograms was applied and the wear resistance testing apparatus was set to 60 cycles per minute, where the stroke of the abrasion element, that is, the glass, is 150 mm with one back and forth movement as one cycle. The glass was loaded to the wear resistance tester as per profile print in FIG. 1 of the General Motors Engineering Standards.

The wear resistance test was performed and the samples were typically visually examined every 500 cycles. The glass was replaced every 5000 cycles.

In addition to visual examination, the depth of wear was determined by optical microscopy. Thus, the wear resistance is reported as number of cycles per micrometer (micron). The results are presented in Table II.

The coefficient of friction was determined by dividing lateral force to move the glass by the normal force 2.7 kg. this was done for each cycle and averages were taken. The polyolefin coatings of the Examples were evaluated for adhesion to the rubber substrate by visual examination and manual examination.

TABLE II

SUMMARY OF CROCKMETER AND WEAR RESULTS

| Sample | Powder Type | Initial COF | Avg. COF | Cycles To fail | Coating Appearance | Depth of Wear, micrometers | Abrasion Resistance cycles/ micrometer |
|---|---|---|---|---|---|---|---|
| Comparative Ex. __ | Control | 0.7027 | 0.6775 | 8640 | None | — | — |
| Comparative Ex. __ | Control | 0.6584 | 0.62041 | 5000 | None | — | — |
| Comparative Ex. __ | HS-37-EX-2 (Versicoat PU) | 0.3093 | 0.4262 | 1314 | — | — | — |

TABLE II-continued

SUMMARY OF CROCKMETER AND WEAR RESULTS

| Sample | Powder Type | Initial COF | Avg. COF | Cycles To fail | Coating Appearance | Depth of Wear, micrometers | Abrasion Resistance cycles/ micrometer |
|---|---|---|---|---|---|---|---|
| Ex. 1 | Hostalen GHR8020 not rolled | 0.277 | 0.3461 | 16600 | Moderately heavy uniform, rough | WT | — |
| Ex. 2 | Hostalen GHR8020 rolled | 0.3208 | 0.4351 | 3300 | Medium thick, uniform, rough | WT | — |
| Ex. 3 | Hostalen GHR8020 rolled | 0.4038 | 0.4497 | 430 | Light, uniform, rough | 52 | 8.3 |
| Ex. 4 | Hostalen GHR8020 | 0.3714 | 0.3946 | 4835 | Light to medium, slightly rough | 75 | 64.5 |
| Ex. 5 | Hostalen GHR8020 rolled | 0.3171 | 0.3455 | 5000 | Medium to heavy, slightly rough | 59 | 84.7 |
| Ex. 6 | Polymatte 31 | 0.7354 | 0.7353 | 106 | Moderate to thin, smooth | WT | — |
| Ex. 7 | Polymatte 31 | 0.7758 | 0.7758 | 115 | Moderate to thin, smooth | WT | — |
| Ex. 8 | Hostalen GURX117 | 0.3168 | 0.4149 | 209 | Medium thick uniform unfused | WT | — |
| Ex. 9 | Microscrub 50 not rolled | 0.4663 | 0.515 | 244 | Aesthetically mottled | WT | — |
| Ex. 10 | Hostalen GHR8020 not rolled | 0.2475 | 0.2823 | 20000 | Thick, smooth, translucent | 153 | 130.7 |
| Ex. 11 | Microscrub 50 rolled | 0.4404 | 0.464 | 10000 | Thick, smooth, translucent | WT | — |
| Ex. 12 | Microscrub 50/Hostalen GHR8020 60/40 rolled | 0.3657 | 0.3409 | 20000 | Thick, smooth, translucent | 257 | 77.8 |
| Ex. 13 | Hostalen GHR8020# | 0.295 | 0.3061 | 20000 | Thick, smooth, translucent | 62 | 322.6 |
| Ex. 14 | Hostalen GUR400# rolled | 0.2402 | 0.3186 | 20000 | Smooth, white film, poor adhesion | 33 | 606.1 |
| Ex. 15 | Hostalen GURX117 rolled | 0.3322 | 0.3889 | 6675 | Smooth, white film; poor adhesion | 20 | 333.8 |
| Ex. 16 | Hostalen GHR8020 rolled | 0.3593 | 0.3229 | 20000 | Thick, smooth, translucent | 129 | 155.0 |
| Ex. 17 | Hostalen GHR8110 rolled | 0.2371 | 0.255 | 20000 | Thick, translucent | 31 | 645.2 |
| Ex. 18 | GHR8020/ Microscrub 50 60/40 rolled | .05321 | 0.34 | 10000 | White, moderately thick | 43 | 232.6 |
| Ex. 19 | Hostalen GHR8020/ Microscrub | 0.4698 | 0.4563 | 4153 | Moderately thin, trans- | 96 | 43.3 |

TABLE II-continued

SUMMARY OF CROCKMETER AND WEAR RESULTS

| Sample | Powder Type | Initial COF | Avg. COF | Cycles To fail | Coating Appearance | Depth of Wear, micrometers | Abrasion Resistance cycles/ micrometer |
|---|---|---|---|---|---|---|---|
| | 50 50/50 rolled | | | | lucent | | |
| Ex. 20 | Hostalen GHR8020/ Microscrub 50 25/75 not rolled | 0.3814 | 0.4364 | 2334 | Medium thin rough, translucent | WT | — |
| Ex. 21 | Hostalen GHR8020/ Microscrub 50 25/75 not rolled | 0.3676 | 0.5592 | 1000 | Medium thin rough, translucent | WT | — |
| Ex. 22 | Hostalen GHR8020/ Microscrub 50 25/75 not rolled | 0.4782 | 0.4928 | 6146 | Medium thin rough, translucent | WT | — |
| Ex. 23 | UHMW PE (Aldrich) | 1.1185 | 1.0854 | 59 | Very thin, milky white | WT | — |
| Ex. 24 | HDPE Spectroscopy Grade MP: 130–145° C., (Aldrich) | 0.4545 | 0.5719 | 246 | Thin, smooth transparent | WT | — |
| Ex. 25 | Medium density PE (MDPE) MP: 109–111, (Aldrich) | 0.5158 | 0.5588 | 2487 | Medium thickness, transparent bumpy | WT | — |
| Ex. 26 | PE UHMW (Aldrich) rolled | 0.4945 | 0.5439 | 121 | Thick white film, poor adhesion | 32 | 3.8 |
| Ex. 27 | PE UHMW (Aldrich), treated surface not rolled | 0.3007 | 0.3508 | 10000 | Thick off-white film, poor adhesion | 34 | 294.1 |
| Comparative Ex. 28 | Vistomer HD2800 rolled | 0.3976 | 0.4096 | 85 | Smooth, thick translucent film | 40 | 2.1 |
| Ex. 29 | Vistomer HD2800, rolled | 0.3667 | 0.381 | 5670 | Smooth, thick, transparent film | WT | — |
| Ex. 30 | Coathylene NC5374 rolled | 0.22 | 0.2152 | 10000 | Smooth, transparent, cracks in groove after test | 97 | 103.1 |
| Ex. 31 | Coathylene NB6454 rolled | 0.2077 | 0.2134 | 10000 | Smooth, transparent puddles | 126 | 79.4 |
| Ex. 32 | Coathylene HO1681 rolled | 0.4499 | 0.5867 | 6390 | Smooth, transparent, thin | WT | — |
| Ex. 33 | Coathylene HA2454 rolled | 0.4486 | 0.4526 | 62 | Smooth, transparent, puddles | 68 | 0.9 |

TABLE II-continued

SUMMARY OF CROCKMETER AND WEAR RESULTS

| Sample | Powder Type | Initial COF | Avg. COF | Cycles To fail | Coating Appearance | Depth of Wear, micrometers | Abrasion Resistance cycles/micrometer |
|---|---|---|---|---|---|---|---|
| Ex. 34 | Coathylene HA1931 rolled | 0.3389 | 0.4275 | 1240 | Smooth, transparent, puddles | 348 | 3.6 |
| Ex. 35 | Coathylene PB0580 rolled | 0.3545 | 0.4016 | 4259 | Fairly thick, uniform, rough | 140 | 30.4 |
| Ex. 36 | Coathylene PB0580 | 0.4386 | 0.4778 | 180 | Smooth, transparent | 113 | 1.6 |
| Ex. 37 | Coathylene PY0787 rolled | 0.2046 | 0.3029 | 3108 | Smooth, thick, transparent film | 78 | 39.8 |
| Ex. 38 | Hostalen GHR8020/ $MoS_2$ 100/6.5 rolled | 0.296 | 0.3298 | 10000 | Medium thickness, uniform, rough | 87 | 114.9 |
| Ex. 39 | Microscrub 50/ $MoS_2$ 100/6.5 | 0.5217 | 0.5225 | 63 | Thin, mottled | 59 | 1.1 |
| Ex. 40 | Microscrub 50/ Hostalen GHR8020/ $MoS_2$ rolled | 0.3884 | 0.3818 | 10000 | Moderately thin, translucent | 121 | 82.6 |
| Ex. 41 | NB6454/ GHR8110 25/75 rolled | 0.2061 | 0.2351 | 10000 | Thick, uniform, rough | 42 | 238.1 |
| Ex. 42 | Coathylene NC5374/ GHR8110 25/75 rolled | 0.2438 | 0.2512 | 10000 | Thick, uniform, rough | 66 | 151.5 |
| Ex. 43 | Coathylene NC5374/ GHR8110 50/50 rolled | 0.2538 | 0.2613 | 10000 | Thick, uniform, rough | 89 | 112.4 |
| Ex. 44 | Coathylene NB6454/ Hostalen GHR8110 50/50 rolled | 0.1945 | 0.217 | 10000 | Thick, uniform, rough | 40 | 250.0 |
| Ex. 45 | Coathylene NC5374/ GHR8110 75/25 not rolled | 0.2515 | 0.2816 | 10000 | Thick, uniform, rough | 83 | 120.5 |
| Ex. 46 | Hostalen GHR8110 not rolled | 0.2724 | 0.2575 | 10000 | Thick, uniform, rough | 115 | 87.0 |
| Ex. 47 | Coathylene NC5374/ GHR8110 25/75 not rolled | 0.2227 | 0.2165 | 10000 | Thick, uniform, rough | 45 | 222.2 |
| Ex. 48 | Coathylene NC5374/ GHR8110 38/62 not rolled | 0.2136 | 0.246 | 10000 | Thick, uniform, rough | 76 | 131.6 |
| Ex. 49 | Coathylene NC5374 not rolled | 0.3462 | 0.3431 | 5100 | Bumpy | WT | — |

TABLE II-continued

SUMMARY OF CROCKMETER AND WEAR RESULTS

| Sample | Powder Type | Initial COF | Avg. COF | Cycles To fail | Coating Appearance | Depth of Wear, micrometers | Abrasion Resistance cycles/ micrometer |
|---|---|---|---|---|---|---|---|
| Ex. 50 | Coathylene NC5374/ GHR8110 75/25 not rolled | 0.2782 | 0.2847 | 10000 | Thick, uniform, rough | 209 | 47.8 |
| Ex. 51 | Coathylene NC5374/ GHR8110 50/50 not rolled | 0.2136 | 0.2182 | 10000 | Thick, uniform, rough | 73 | 137.0 |

WT—worn through
rubber substrate not cured at time crystalline polyolefin powder was applied The coatings of the Examples show reduced coefficients of friction in comparison to the comparative Example. In particular, the coatings of Examples 9, 10, 11, 13, 14b, 14/18, 15-17, 19 21, 22, 23b, have significantly reduced coefficients of friction and show good wear characteristics. When the Versicoat® polyurethane control coating is fresh, the wear resistance is typically about 400 cycles/micron. However, with weathering, the wear resistance typically drops to about 10 cycles/micron, and the coefficient of friction greatly increases.

Thus, a reduced coefficient of friction is obtained with the coated substrates of the present invention. The wear resistance of the coating containing a polyethylene polymer having a molecular weight of 300,000 and higher, Examples 13 to 17 is greater than coatings containing polyethylene with a molecular weight below 300,000, such as Examples 30 and 31 However, the adhesion of the ultra high molecular weight HDPE to the substrate is typically not as strong as with the other HDPE.

Surprisingly, the coating which is a mixture of the of ultra-high molecular weight HDPE and the lower-molecular-weight HDPE has improved wear resistance and satisfactory adhesion to the substrate.

The coated substrate prepared in example 14, employed a polyethylene polymer having a molecular weight in excess of 6,000,000, GUR 400F. The resulting laminate had poor adherence making it less preferred for a vehicle seal but useful for a laminate having a temporary or easily removable polyolefin coating.

Crystalline polyolefin powders were also applied to rubber substrates having a temperature in the range of 20° C. to 26° C.; the coatings were satisfactory based on visual evaluation.

What is claimed is:

1. A vehicle seal comprising:
    polyolefin rubber body having a glass run channel therethrough, said channel defined by glass-contacting surfaces of the rubber body; and
    a continuous coating of fused polyolefin disposed on at least a portion of the glass contacting surfaces and adherent to the polyolefin rubber body; said coating comprising a crystalline polyolefin polymer having weight average molecular weight of from 30,000 to 10,000,000 and a degree of crystallinity of 20 wt. % to 100 wt. %.

2. A laminate comprising:
    9 polyolefin rubber substrate; and
    a continuous coating of fused polyolefin disposed on and adherent to the polyolefin rubber substrate said coating comprising a crystalline polyolefin polymer having weight average molecular weight of from 30,000 to 10,000,000 and a degree of crystallinity of 20 wt. % to 100 wt. %.

3. The vehicle seal of claim 1, wherein the crystalline polyolefin polymer has a melt flow index from 0.0 to 500 g/10 minutes, at 190° C. under a load of 21.6 kg., and the polyolefin rubber is selected from the group consisting of: ethylene propylene diene terpolymer, ethylene propylene rubber, butyl rubber, chlorobutyl rubber, and bromobutyl rubber, and mixtures thereof.

4. The vehicle seal of claim 3, wherein the crystalline polyolefin polymer comprises a polyethylene comprising at least one high density polyethylene polymer.

5. The vehicle seal of claim 3, wherein the crystalline polyolefin polymer comprises a polypropylene polymer.

6. The vehicle seal of claim 3, wherein the crystalline polyolefin polymer comprises isotactic polypropylene.

7. The vehicle seal of claim 3, wherein the crystalline polyolefin polymer comprises:
    from 10 to 90 parts by weight of high-density polyethylene polymer, having a weight-average molecular weight from 300,000 to 10,000,000 g/mol.; and
    from 10 to 90 parts by weight of high-density polyethylene polymer, having a weight-average molecular weight from 40,000 to 150,000 g/mol.

8. The vehicle seal of claim 6, wherein the rubber body is ethylene propylene diene terpolymer.

9. The vehicle seal of claim 3, wherein the crystalline polyolefin polymer comprises:
    from 25 to 75 parts by weight, of the high-density polyethylene polymer, having a weight-average molecular weight from 600,000 to 6,000,000 g/mol.; and
    from 25 to 75 parts by weight of high-density polyethylene polymer, having a weight-average molecular weight from 40,000 to 150,000 g/mole.

10. The vehicle seal of 4, wherein the crystalline polyolefin polymer has a weight average molecular weight of from 30,000 to 6,000,000.

11. The vehicle seal of claim 9, wherein the rubber body is ethylene propylene diene terpolymer.

12. The vehicle seal of claim 3, wherein the continuous coating of fused polyolefin coating has an average coefficient of friction against glass of less than 0.5 and a wear resistance of at least 30 cycles per micrometer as measured using glass having with satin edge, under a 2.7 kg load.

13. The vehicle seal of claim 12, wherein the continuous coating of fused polyolefin has an average coefficient of friction against glass of less than 0.4 and a wear resistance of at least 100 cycles/$\mu$m as measured by using glass having with satin edge, under a 2.7 kg load.

14. The vehicle seal of claim 13, wherein the continuous coating of fused polyolefin has a wear resistance of at least 200 cycles/$\mu$m as measured by using glass having with satin edge, under a 2.7 kg load.

15. The vehicle seal of claim 13, wherein the continuous coating of fused polyolefin has a wear resistance of at least 300 cycles/$\mu$m as measured by using glass having with satin edge, under a 2.7 kg load.

16. The vehicle seal of claim 13, wherein the continuous coating of fused polyolefin has an average thickness of 10 $\mu$m to 3 mm.

* * * * *

UNITED STATES PATENT AND TRADEMARK OFFICE
CERTIFICATE OF CORRECTION

PATENT NO. : 6,982,112 B2  Page 1 of 1
APPLICATION NO. : 10/189329
DATED : January 3, 2006
INVENTOR(S) : Aubert Y. Coran It is certified that error appears in the above-identified patent and that said Letters Patent is hereby corrected as shown below:

On the Title Page,

(73) Assignee: delete "GenCorp, Inc., Sacremento, CA (US)" and insert -- GDX North America Inc., New York, NY (US) --.

Signed and Sealed this

Eighteenth Day of December, 2007

JON W. DUDAS
*Director of the United States Patent and Trademark Office*